United States Patent
Meski et al.

(10) Patent No.: US 6,991,222 B2
(45) Date of Patent: Jan. 31, 2006

(54) STRUCTURED PACKING WITH INCREASED CAPACITY

(76) Inventors: George Amir Meski, 3720 Crest View Dr., Allentown, PA (US) 18103; Swaminathan Sunder, 6009 Helen Dr., Allentown, PA (US) 18104

( * ) Notice: Subject to any disclaimer, the term of this patent is extended or adjusted under 35 U.S.C. 154(b) by 57 days.

(21) Appl. No.: 10/404,803

(22) Filed: Mar. 31, 2003

(65) Prior Publication Data

US 2004/0188867 A1   Sep. 30, 2004

(51) Int. Cl.
*B01F 3/04* (2006.01)

(52) U.S. Cl. ............... 261/94; 261/112.2; 261/DIG. 72

(58) Field of Classification Search ............ 261/94–98, 261/112.1, 112.2, DIG. 72; 210/150; 202/158; 62/643, 906; 428/182, 184, 185
See application file for complete search history.

(56) References Cited

U.S. PATENT DOCUMENTS

| | | | |
|---|---|---|---|
| 2,042,127 A * | 5/1936 | Sayles | 261/112.1 |
| 3,039,749 A * | 6/1962 | Kohl et al. | 261/112.1 |
| 3,084,918 A * | 4/1963 | Kohl et al. | 261/112.1 |
| 3,402,105 A * | 9/1968 | Sze | 202/158 |
| 3,451,660 A * | 6/1969 | Hamon | 261/112.1 |
| 3,540,702 A * | 11/1970 | Uyama | 261/112.2 |
| 3,574,103 A * | 4/1971 | Latkin | 428/72 |
| 4,171,334 A * | 10/1979 | Reiter | 261/112.1 |
| 4,296,050 A | 10/1981 | Meier | 261/112.2 |
| 4,477,394 A * | 10/1984 | Armstrong et al. | 261/112.1 |
| 4,481,155 A | 11/1984 | Frohwerk | 261/94 |
| 4,579,694 A * | 4/1986 | Bradley, Jr. | 261/112.2 |
| 4,847,019 A * | 7/1989 | McNab | 261/112.2 |
| 5,013,492 A * | 5/1991 | Gay et al. | 261/112.2 |
| 5,154,859 A * | 10/1992 | Bosquain et al. | 261/112.2 |
| 5,326,503 A * | 7/1994 | Iwashita et al. | 261/112.1 |
| 5,632,934 A | 5/1997 | Billingham et al. | 261/112.2 |
| 5,921,109 A | 7/1999 | Billingham et al. | 62/643 |
| 6,096,407 A * | 8/2000 | Vodicka et al. | 428/175 |
| 6,101,841 A | 8/2000 | Billingham et al. | 62/643 |
| 6,212,907 B1 | 4/2001 | Billingham et al. | 62/646 |
| 6,251,499 B1 * | 6/2001 | Lehman et al. | 428/182 |
| 6,277,340 B1 * | 8/2001 | Paikert et al. | 422/211 |
| 6,315,804 B1 * | 11/2001 | Bradley | 55/440 |
| 6,427,985 B1 * | 8/2002 | Kaibel et al. | 261/112.2 |
| 6,517,058 B1 * | 2/2003 | Engh et al. | 261/112.1 |
| 2002/0063344 A1 | 5/2002 | Pagade | 261/94 |

FOREIGN PATENT DOCUMENTS

| | | |
|---|---|---|
| EP | 0858366 | 7/2000 |
| GB | 1 221 073 | 2/1971 |
| WO | 97/16247 | 5/1997 |

* cited by examiner

*Primary Examiner*—Richard L. Chiesa
(74) *Attorney, Agent, or Firm*—Willard Jones, II

(57) ABSTRACT

A structured packing element has at least one edge adapted to intermesh with an edge of at least one other structured packing element. The structured packing elements may be used in a packed section in an exchange column which includes: a first layer of structured packing including a first structured packing element having an upper edge adapted to intermesh with a generally vertically adjacent lower edge of a second structured packing element; and a second layer of structured packing located above the first layer of structured packing, the second layer including the second structured packing element having the lower edge adapted to intermesh with the generally vertically adjacent upper edge of the first structured packing element. The upper edge of the first structured packing element intermeshes with the lower edge of the second structured packing element.

7 Claims, 9 Drawing Sheets

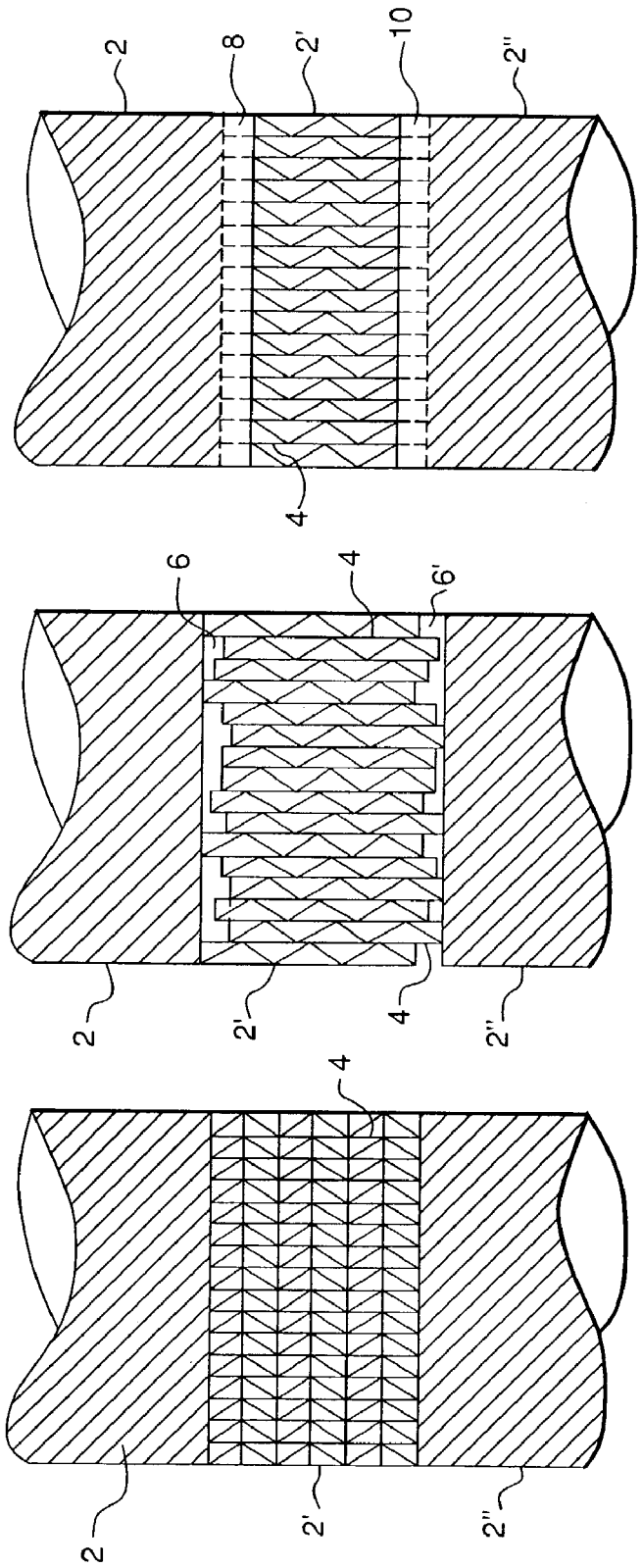

STRUCTURED PACKING WITH INCREASED CAPACITY

BACKGROUND OF THE INVENTION

The present invention relates to structured packing and to methods for installing such packing in an exchange column to provide increased capacity. The structured packing has particular application in cryogenic air separation processes, although it also may be used in other heat and/or mass transfer processes that can utilize structured packing.

The term, "column" (or "exchange column") as used herein, means a distillation or fractionation column or zone, i.e., a column or zone wherein liquid and vapor phases are counter currently contacted to effect separation of a fluid mixture, such as by contacting of the vapor and liquid phases on packing elements or on a series of vertically-spaced trays or plates mounted within the column.

The term "column section" (or "section") means a zone in a column filling the column diameter. The top or bottom of a particular section or zone ends at the liquid and vapor distributors respectively.

The term "packing" means solid or hollow bodies of predetermined size, shape, and configuration used as column internals to provide surface area for the liquid to allow mass transfer at the liquid-vapor interface during countercurrent flow of two phases. Two broad classes of packings are "random" and "structured".

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of thin metal foil, expanded metal or woven wire screen stacked in layers or as spiral windings.

In processes such as distillation or direct contact cooling, it is advantageous to use structured packing to promote heat and mass transfer between counter-flowing liquid and vapor streams. Structured packing, when compared with random packing or trays, offers the benefits of higher efficiency for heat and mass transfer with lower pressure drop. It also has more predictable performance than random packing.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen). Various packings or trays may be used to bring the liquid and gaseous phases of the mixture into contact to accomplish mass transfer between the phases.

The most commonly used structured packing consists of corrugated sheets of metal or plastic foils (or corrugated mesh cloths) stacked vertically. These foils may have various forms of apertures and/or surface texture features aimed at improving the heat and mass transfer efficiency. An example of this type of structured packing is disclosed in U.S. Pat. No. 4,296,050 (Meier). It also is well-known in the prior art that mesh type packing helps spread liquid efficiently and gives good mass transfer performance, but mesh type packing is much more expensive than most foil type packing.

It is very desirable to increase the capacity of structured packing. This enables the use of less structured packing for any given separation, thus reducing the cost of carrying out the separation.

Usually the capacity of structured packing is limited by flooding. Mass transfer flooding, which is the premature degradation in mass transfer performance prior to the onset of hydraulic flooding, occurs when the mass transfer efficiency of the column starts deteriorating rapidly with the increase of vapor and/or liquid flow in the column. Hydraulic flooding occurs when the pressure drop across the packing bed starts increasing rapidly with the increase of vapor and/or liquid flow.

It is known from the prior art that the capacity of structured packing can be increased by modifying the edges of individual packing sheets. Typical modifications include reduced crimp heights, changed corrugation angle, serrations, etc., which modifications are typically made at the bottom of all sheets or at the top and bottom of alternating sheets. Examples of such modifications are disclosed in U.S. Pat. No. 5,632,934 (Billingham, et al.) and U.S. Pat. No. 6,101,841 (Billlingham, et al.). Other modifications include S-shaped corrugations on both ends of every sheet, such as those disclosed in EP 0 858 366 B1 and International Application WO 97/16247. All such modifications are made in such a way that during operation the pressure drop in the transitions is reduced. Operation of a packed column at a pressure drop greater than 0.7 inch water per foot is taught in U.S. Pat. No. 5,921,109 (Billingham, et al) and U.S. Pat. No. 6,212,907 B1 (Billingham, et al.). These patents cover cases wherein only the bottoms of the packing sheets are modified, and cases wherein both the tops and bottoms of the packing sheets are modified.

Although these prior art modifications may improve the capacity of structured packing, those designs still suffer from a problem of uncontrolled and random gaps between adjacent layers of structured packing, which gaps are a result of the manufacturing methods used for conventional structured packing sheets. The uncontrolled gaps between adjacent layers are due to a less than perfect alignment of the individual structured packing elements or sheets within the layers. This can lead to performance degradation in terms of both mass transfer and pressure drop, especially at high flow rates.

It is desired to have improved structured packing sheets or elements which significantly increase the capacity of structured packing.

It is further desired to have a structured packing which enables improved performance over that of conventional structured packing.

It is still further desired to have a structured packing for use in an exchange column having increased capacity enabling increased throughput before reaching flood conditions.

It is still further desired to have a structured packing that shows high performance characteristics for cryogenic applications, such as those used in air separation, and for other heat and/or mass transfer applications.

It is still further desired to have a structured packing of the corrugated type which overcomes many of the difficulties and disadvantages of the prior art to provide better and more advantageous results.

It is still further desired to have a process for cryogenic air separation which utilizes a structured packing that provides higher capacity than that of prior art structured packing.

It is still further desired to have a process for cryogenic air separation which may be carried out at increased capacity while avoiding flooding.

It also is desired to have a method of assembling and installing a section of structured packing in an exchange column which affords better performance than the prior art, and which also overcomes many of the difficulties and disadvantages of the prior art to provide better and more advantageous results.

BRIEF SUMMARY OF THE INVENTION

The present invention is a structured packing element and also includes an assembly of such structured packing elements. Structured packing using the structured packing element of the present invention may be used in a process for cryogenic air separation, a process for exchanging mass and/or heat between two fluids, and in an exchange column for exchanging heat and/or mass between a first phase and a second phase. The invention also includes a method for assembling a packed section in an exchange column, a method for manufacturing a structured packing element, and a method for increasing capacity in an exchange column for exchanging heat and/or mass between a liquid and a vapor.

In one embodiment, the structured packing element has at least one edge adapted to intermesh with an edge of at least one other structured packing element. In a variation of that embodiment, at least a portion of the at least one edge has a textured surface. In another variation, at least a portion of the structured packing element has a plurality of corrugations forming alternating peaks and troughs across at least a portion of the structured packing element.

In another embodiment, a structured packing element includes a means for intermeshing at least one edge of the structured packing element with an adjacent edge of another structured packing element. There are several variations of this embodiment. In one variation, the means for intermeshing comprises at least one serration in the at least one edge. In a variant of that variation, the at least one serration is blunt. In another variant, the at least one serration is wavy. In yet another variation of this embodiment, the means for intermeshing comprises at least one slot in the at least one edge. In a variant of this variation, the means for intermeshing further comprises at least one serration in the slot.

Another embodiment of the invention is an assembly of structured packing elements, comprising at least two structured packing elements, each of the structured packing elements having at least one edge adapted to intermesh with an adjacent edge of another structured packing element.

Yet another embodiment is an assembly of structured packing elements, comprising a first structured packing element having an upper edge and a second structured packing element having a lower edge adjacent the upper edge of the first structured packing element, each of said lower and upper edges being adapted to intermesh with each other of the lower and upper edges.

Still yet another embodiment of the invention is a packed section in an exchange column, comprising: a first layer of structured packing comprising a first structured packing element having an upper edge adapted to intermesh with a generally vertically adjacent lower edge of a second structured packing element; and a second layer of structured packing located above the first layer of structured packing, the second layer comprising the second structured packing element having the lower edge adapted to intermesh with the generally vertically lower edge of the first structured packing element. In a variation of this embodiment, the upper edge of the first structured packing element intermeshes with the lower edge of the second structured packing element.

Another aspect of the invention is an exchange column for exchanging heat and/or mass between a first phase and a second phase. The exchange column has at least one structured packing comprising at least one structured packing element having at least one edge adapted to intermesh with an edge of at least one other structured packing element.

Yet another aspect of the invention is a process for cryogenic air separation comprising contacting vapor and liquid counter-currently in at least one distillation column containing at least one mass transfer zone wherein liquid-vapor contact is established by at least one structured packing comprising at least one structured packing element having at least one edge adapted to intermesh with an edge of at least one other structured packing element.

Still yet another aspect of the invention is a process for exchanging mass and/or heat between two fluids comprising contacting said fluid in at least one exchange column wherein fluid-fluid contact is established by at least one structured packing having at least one structured packing element having at least one edge adapted to intermesh with an edge of at least one other structured packing element. In a variation of this process, the fluids flow counter-currently in the exchange column.

The invention also includes a method for assembling a packed section in an exchange column. The method includes multiple steps. The first step to provide the exchange column having a longitudinal axis. The second step is to install in the exchange column a first layer of structured packing comprising a first structured packing element having an upper edge adapted to intermesh with a generally vertically adjacent lower edge of a second structured packing element. The third step is to install in the exchange column a second layer of structured packing located above the first layer of structured packing, the second layer comprising the second structured packing element having the lower edge adapted to intermesh with the generally vertically adjacent upper edge of the first structured packing element. The fourth step is to move the first layer and the second layer toward each other along the longitudinal axis, each of the first and second layers having a longitudinal axis substantially parallel to the longitudinal axis of the exchange column, whereby the upper edge of the first structured packing element intermeshes with the lower edge of the second structured packing element.

The invention also includes a method for manufacturing a structured packing element. This method includes multiple steps. The first step is to provide a plate having at least one edge. The second step is to form in the plate a means for intermeshing the at least one edge of the structured packing element with an adjacent edge of another structured packing element. The third step is to form corrugations in the plate, the corrugations being generally regularly spaced and in substantially parallel relation.

The invention also includes a method for increasing capacity in an exchange column for exchanging heat and/or mass between a liquid and a vapor, the exchange column adapted to contain a first structured packing element having an upper edge and a second structured packing element having a lower edge adjacent the upper edge of the first structured packing element. This method includes multiple steps. The first step is to modify the upper edge and the lower edge whereby the upper edge and the lower edge are adapted to intermesh with each other. The second step is to intermesh the modified upper edge of the first structured packing element with the modified lower edge of the second structured packing element.

BRIEF DESCRIPTION OF SEVERAL VIEWS OF THE DRAWINGS

The invention will be described by way of example with reference to the accompanying drawings, in which:

FIG. 1 is a schematic diagram illustrating several layers of structured packing in an exchange column;

FIG. 2 is a schematic diagram illustrating typical misalignments between adjacent layers of structured packing;

FIG. 3 is a schematic diagram illustrating modifications of the top and bottom edges of sheets of packing according to the present invention, thereby causing adjacent layers of structured packing to intermesh;

DETAILED DESCRIPTION OF THE INVENTION

Figure 4:
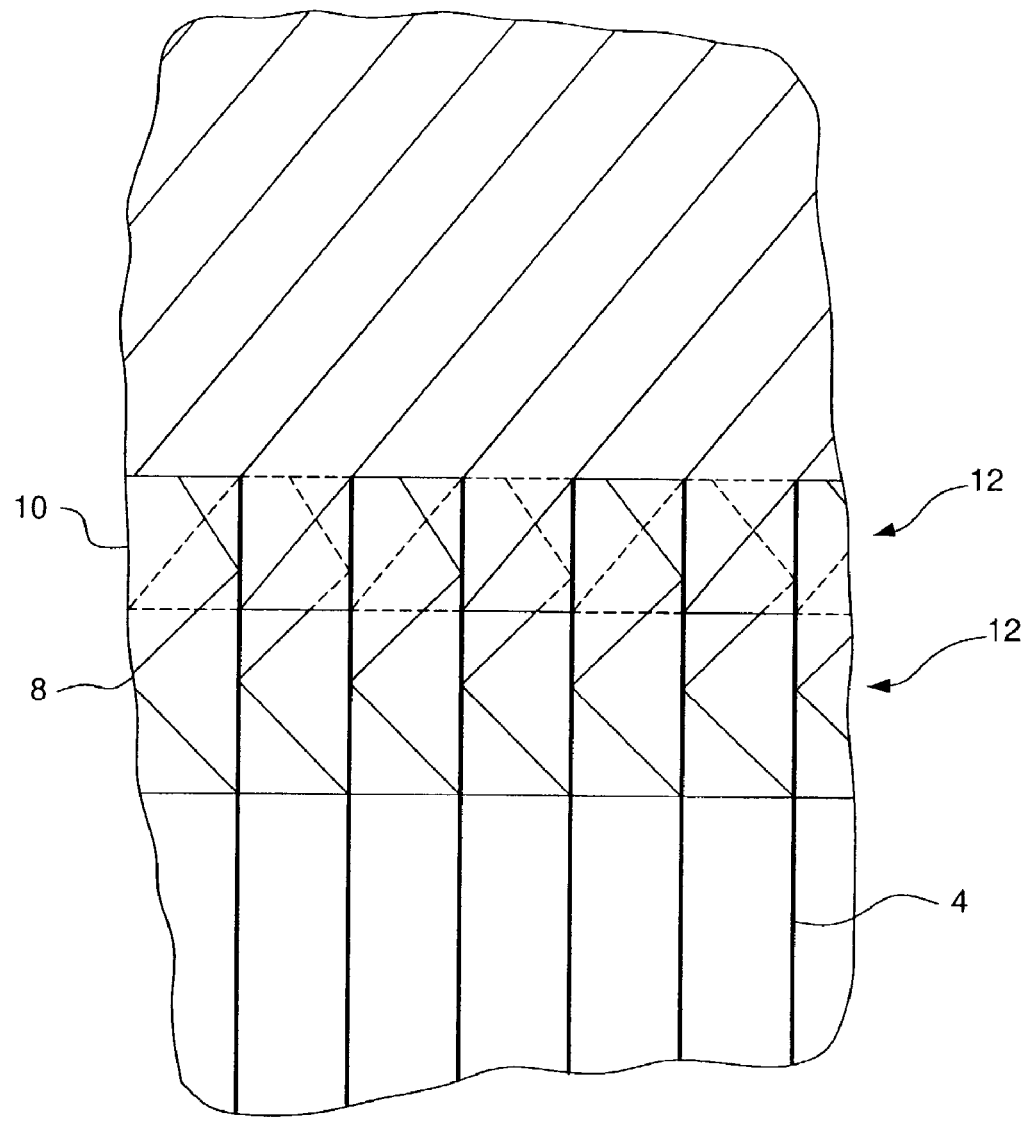
FIG. 4 is a schematic diagram illustrating one embodiment of the present invention using slots at the bottom and top edges of intermeshing sheets of packing.

Applicants have discovered that by making adjacent layers of structured packing to intermesh, they can delay the onset of mass transfer flooding as well as reduce the pressure drop of the structured packing, thereby increasing the capacity of the structured packing. This occurs because of an improvement in the drainage of liquid between the layers and a decrease in the entrainment of liquid droplets into the packing channels.

FIGS. 1 and 2 illustrate multiple layers (2, 2', 2") of structured packing arranged as the layers might be in an exchange column (not shown). When individual sheets 4 of structured packing are assembled into layers of packing, the sheets usually are slightly misaligned in the vertical direction due to imperfections in the manufacturing process. This is shown in the schematic diagram of FIG. 2 in which the misalignments are exaggerated for the purpose of illustration. Such misalignment causes gaps (6, 6') to appear between adjacent layers of packing in an uncontrolled and random fashion within an exchange column, such as a distillation column. Such a phenomenon can lead to local variations in the vapor and liquid flow rates, resulting in deterioration in the mass transfer performance, especially at high flow rates.

Experiments have shown that flooding characteristics of structured packing depend significantly on the presence or absence of these gaps. In principle, it is possible to delay the onset of flooding by carefully aligning individual sheets in each layer, thereby eliminating uncontrolled gaps. But it would be impossible to align individual sheets so precisely during the manufacture of large diameter industrial columns.

The present invention makes the contact between the sheets of two adjacent layers more intimate. As shown in FIG. 3, this is done by modifying both the top edges 8 and the bottom edges 10 of each sheet 4 in such a way that would cause two adjacent layers (e.g., 2 and 2'; or 2' and 2") of packing to intermesh. This improves contact between the adjacent layers of packing, which in turn improves liquid drainage, decreases entrainment of liquid droplets in vapor channels, and thereby delays mass transfer flooding.

In one embodiment of the invention, slots 12 are made at the bottom edge 10 and top edge 8 of each sheet 4 of packing, as shown in FIG. 4. Layers are then assembled in such a way that the corresponding sheets in the layers above and below interlock or intermesh with one another.

Figure 5A:
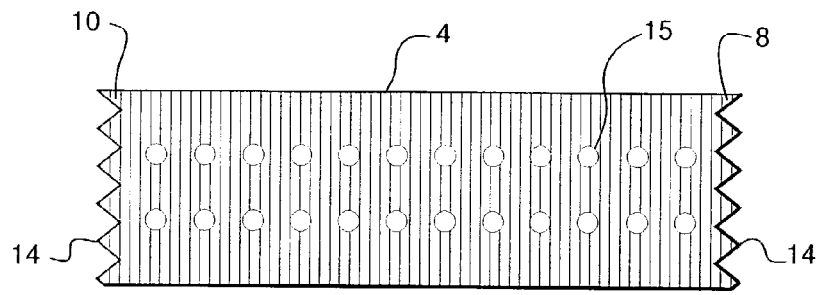
FIGS. 5A and 5B are a schematic diagrams illustrating an embodiment of the present invention wherein serrations are cut at opposite edges (e.g., top and bottom) of a flat packing sheet shown in FIG. 5A before it is corrugated as shown in FIG. 5B.
Figure 5B:
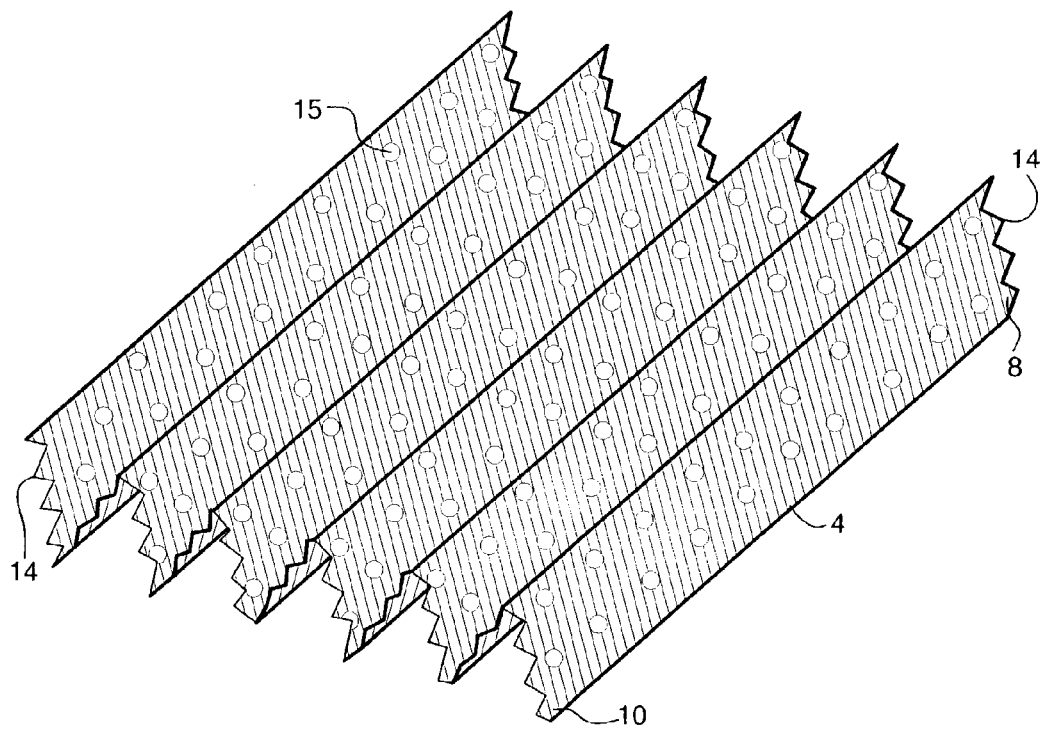

In another embodiment shown in FIGS. 5A and 5B, serrations 14 are cut at both the top edge 8 and the bottom edge 10 of individual flat packing sheets 4, such as shown in FIG. 5A. As an option, apertures 15 may be punched in the flat packing sheet. The serrated packing sheets are then corrugated as shown in FIG. 5B and assembled in layers of packing, and the layers are stacked on top of each other without any special alignment to improve intermeshing. The assembled layers of packing naturally intermesh because of the serrations at both the top and bottom edges of adjacent layers. The intermeshing is not as noticeable as in the case of slots (FIG. 4), but is enough to improve physical contact and liquid drainage during operation so as to significantly delay the onset of mass transfer flooding and reduce pressure drop.

Figure 6A:
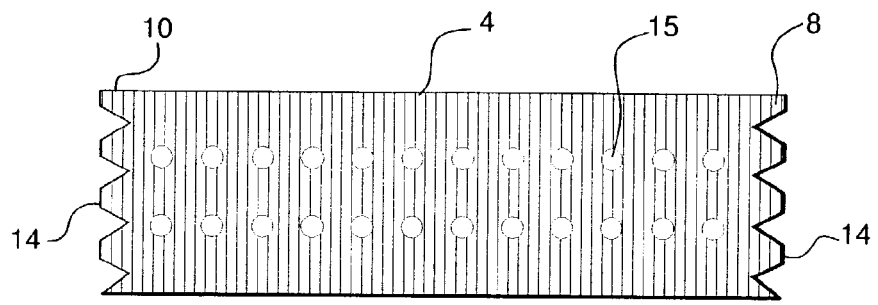
FIGS. 6A and 6B are schematic diagrams illustrating another embodiment of the present invention wherein blunt serrations are cut at both the top and bottom edges of a flat packing sheet shown in FIG. 6A before it is corrugated as shown in FIG. 6B.
Figure 6B:
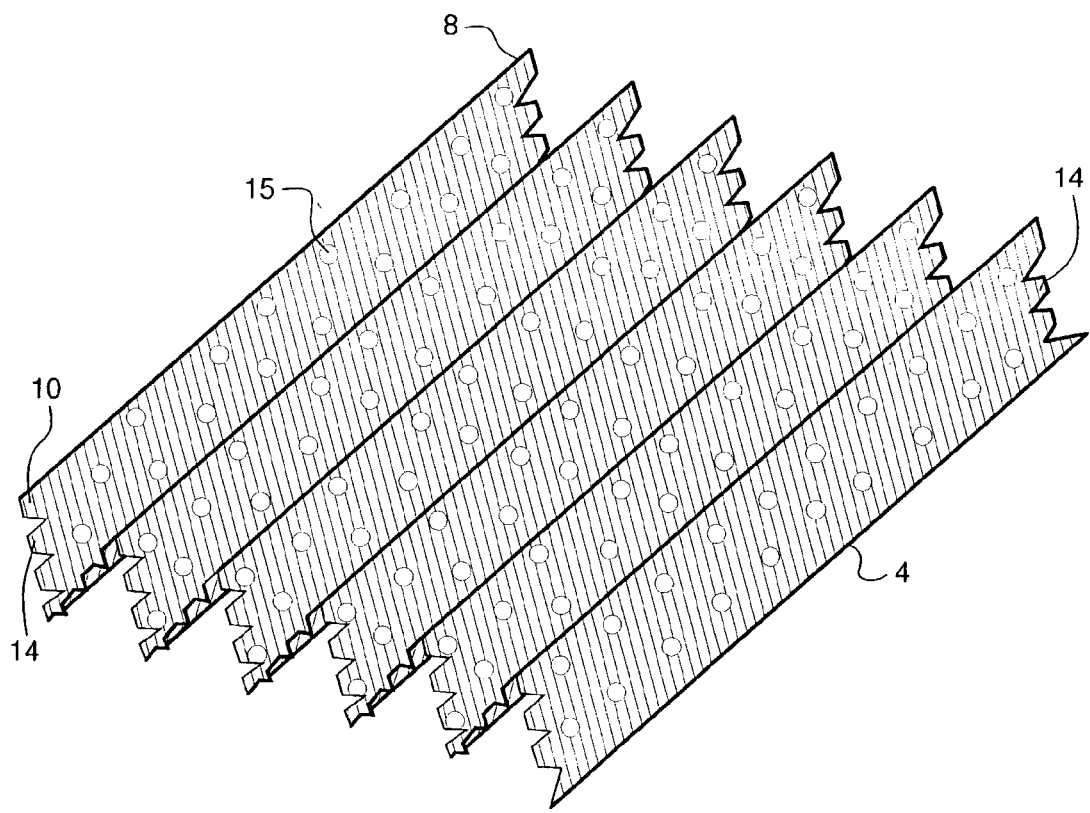
Figure 7A:
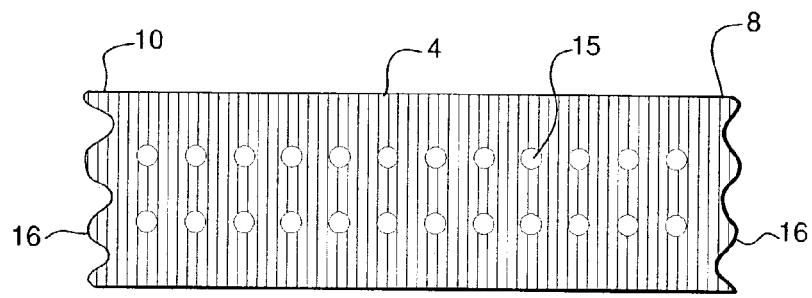
FIGS. 7A and 7B are schematic diagrams illustrating another embodiment of the present invention wherein smooth waves are cut at the bottom and top edges of a flat packing sheet shown in FIG. 7A before it is corrugated as shown in FIG. 7B.
Figure 7B:
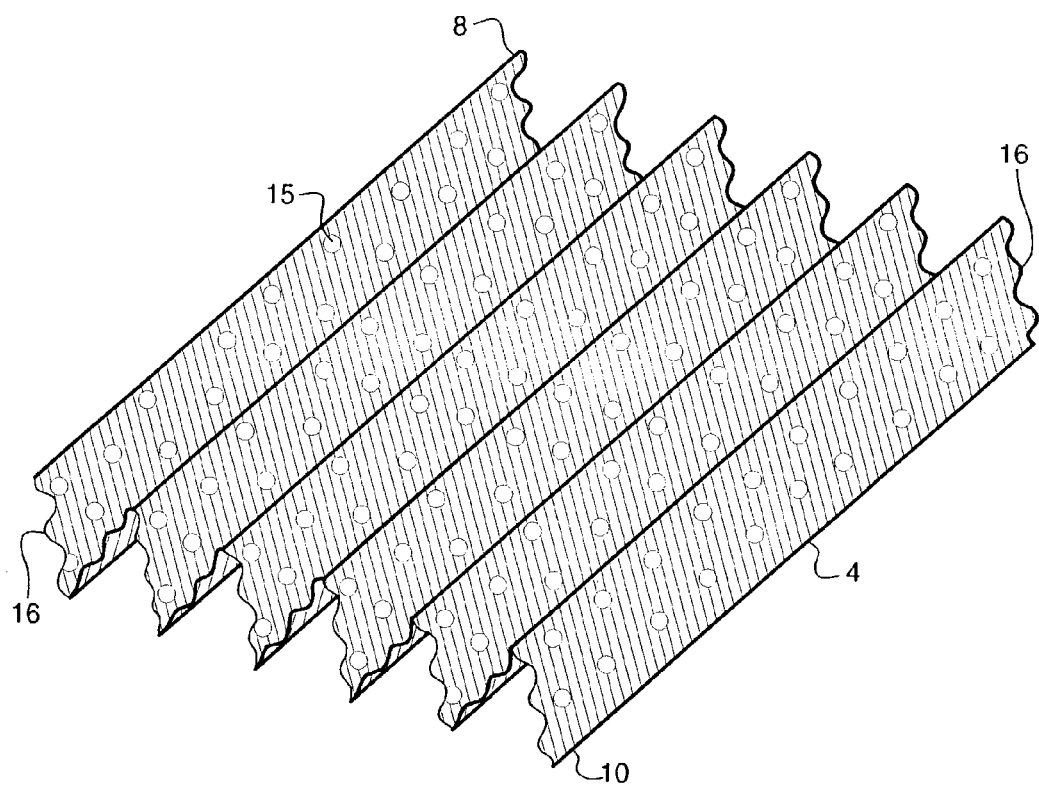
Figure 8A:
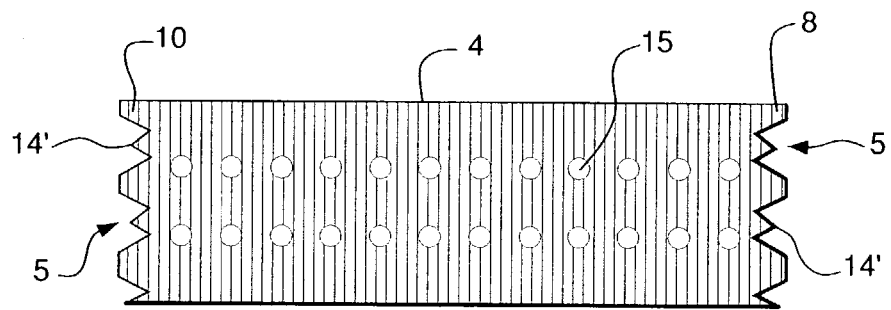
FIGS. 8A/8B and 9A/9B are schematic diagrams illustrating additional embodiments of the present invention wherein large slots with smaller serrations inside the slots are cut at the top and bottom edges of a flat packing sheet as shown in FIG. 8A or 9A before it is corrugated as shown in FIG. 8B or 9B.
Figure 8B:
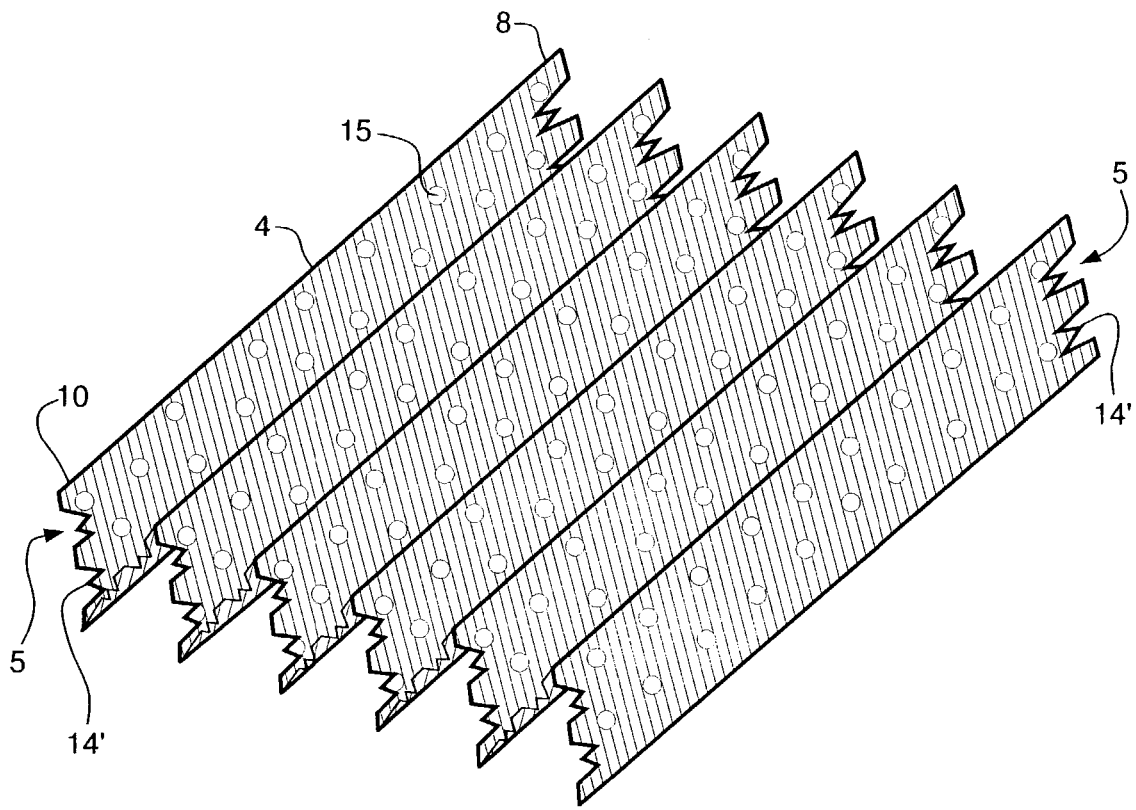
Figure 9A:
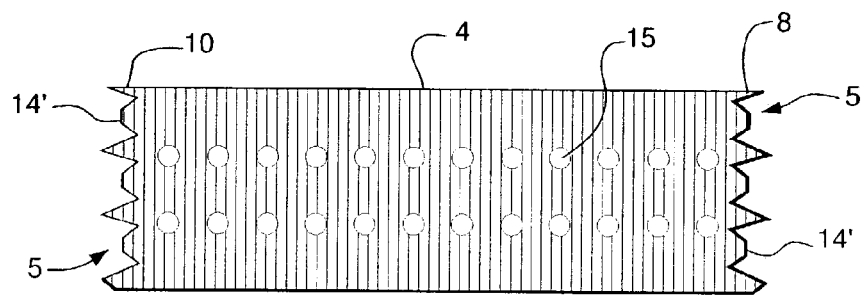
Figure 9B:
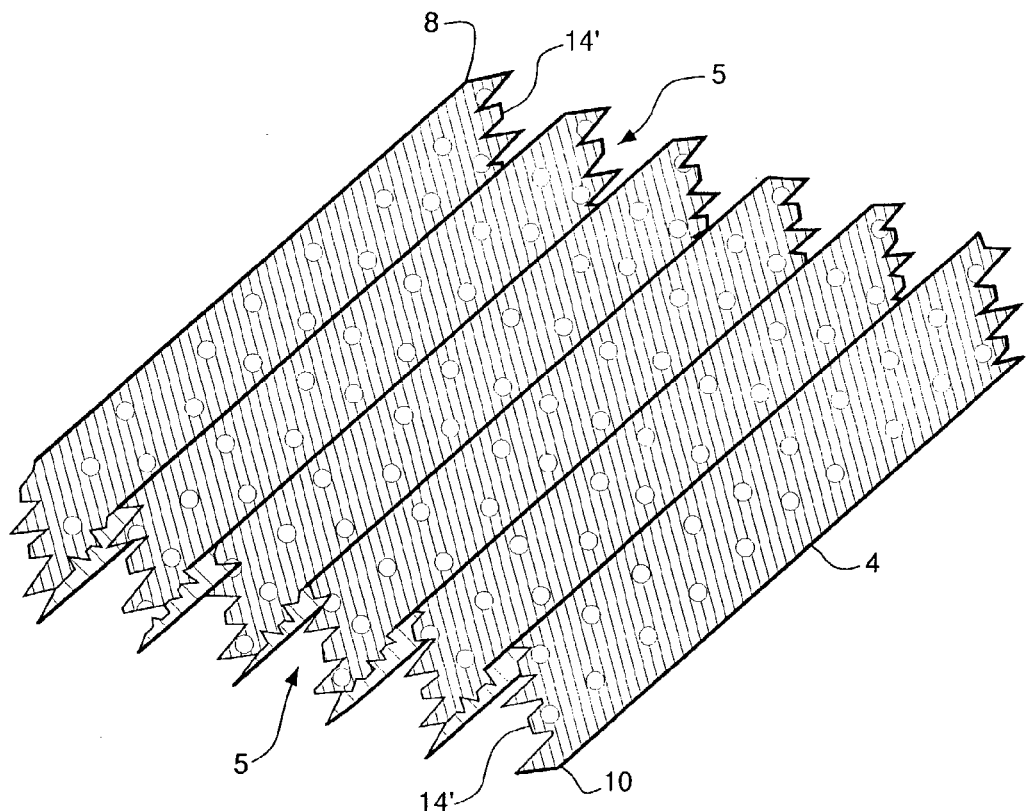

As shown in FIGS. 6A and 6B, in another embodiment the serrations 14 are cut blunt at both the top edge 8 and the bottom edge 10 of the packing sheet 4. In another embodiment shown in FIGS. 7A and 7B, smooth waves 16 are formed at the bottom edge 8 and the top edge 10 of the packing sheet 4. In the embodiments shown in FIGS. 8A and 8B and in FIGS. 9A and 9B, large slots 5 with smaller serrations 14' inside the slots are used.

Figure 10A:
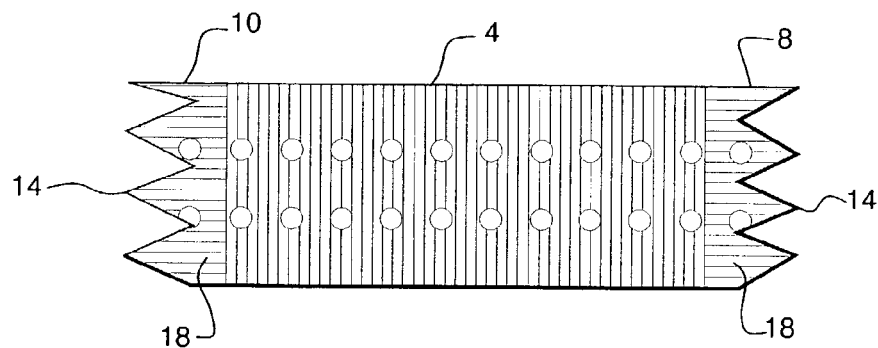
FIGS. 10A and 10B are schematic diagrams illustrating another embodiment of a packing sheet according to the present invention wherein vertical texture is applied on the modified bottom and top edges of a flat packing sheet shown in FIG. 10A before it is corrugated as shown in FIG. 10B.
Figure 10B:
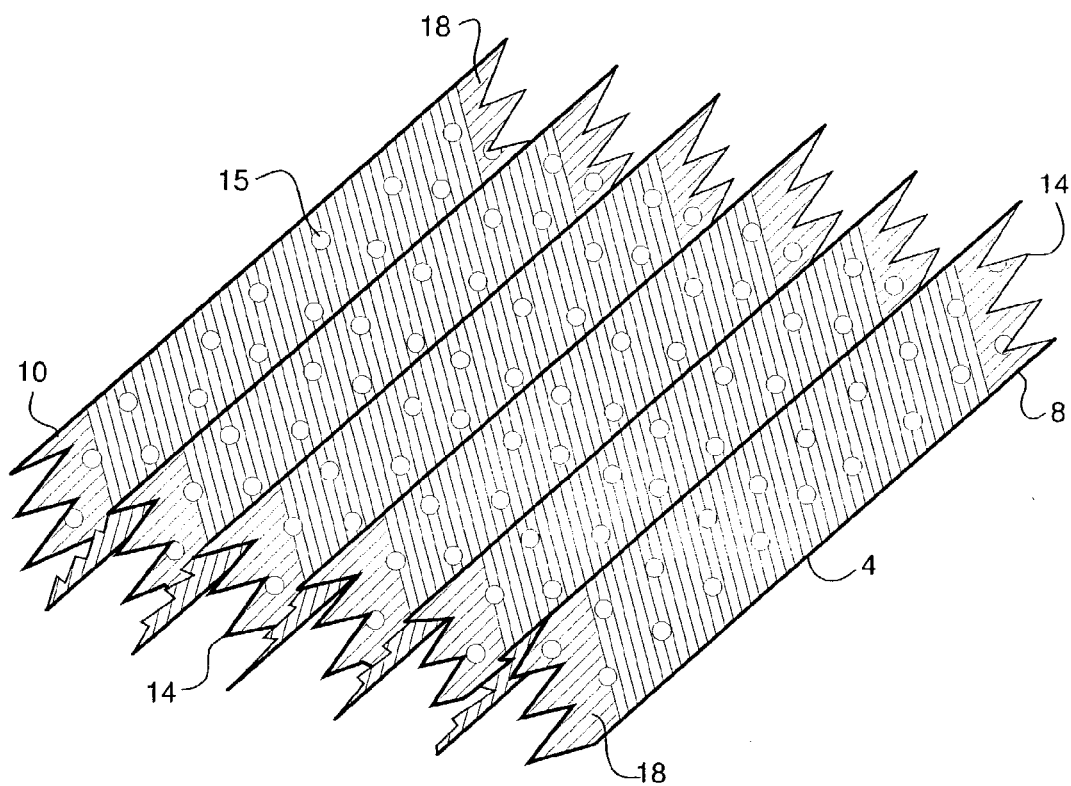

As shown in FIGS. 10A and 10B, one variation which can be applied to any of the embodiments is to introduce surface texture 18 on the bottom edge 10 and/or the top edge 8 of the packing sheet 4. Preferably, the areas of the edges with surface texture occupy the modified area of the packing sheet plus about 30% above and below the modified area of the packing sheet. Surface texture improves the rigidity of the modifications and promotes more stable fluid flow from the edges of the packing sheets.

The separation performance of structured packing often is given in terms of height equivalent to a theoretical plate (HETP). The term "HETP" means the height of packing over which a composition change is achieved which is equivalent to the composition change achieved by a theoretical plate. The term "theoretical plate" means a contact process between vapor and liquid such that the existing vapor and liquid streams are in equilibrium. The smaller the HETP of a particular packing for a specific separation, the more efficient the packing because the height of packing being utilized decreases with the HETP.

Two other parameters pertaining to performance are vapor velocity ($K_v$) and dP/dt, which is the pressure drop that occurs per foot of packing in the vertical direction. Vapor velocity ($K_v$) is defined as follows:

$$K_v = U_v[\rho_v/(\rho_l-\rho_v)]^{0.5}$$

Where $U_v$=superficial velocity of the vapor phase in the packed section
$\rho_v$=density of the vapor phase
$\rho_l$=density of the liquid phase.

Figure 11:
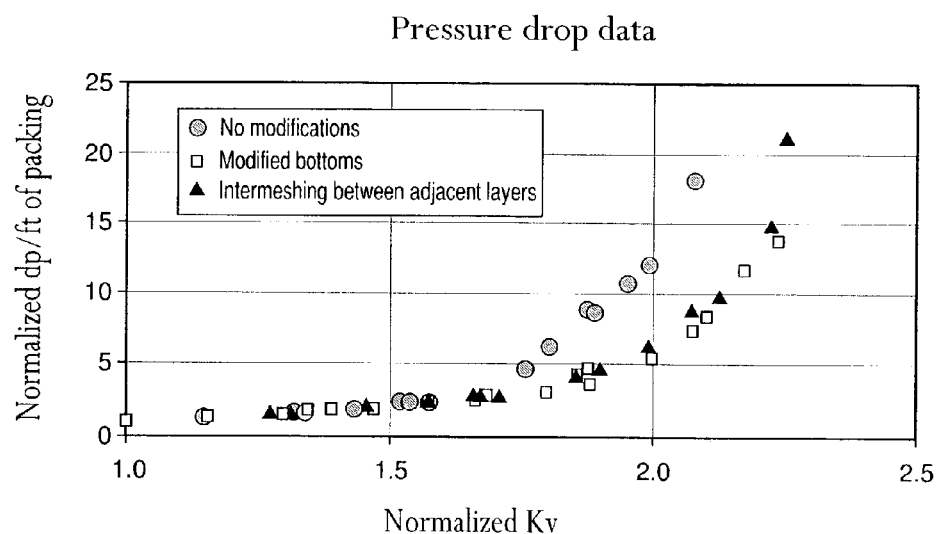
FIG. 11 is graph illustrating the performance of the structured packing of the present invention in comparison to the performance of commercially available structured packing with and without modified bottoms in terms of normalized dP/ft versus normalized vapor velocity (Kv)
Figure 12:
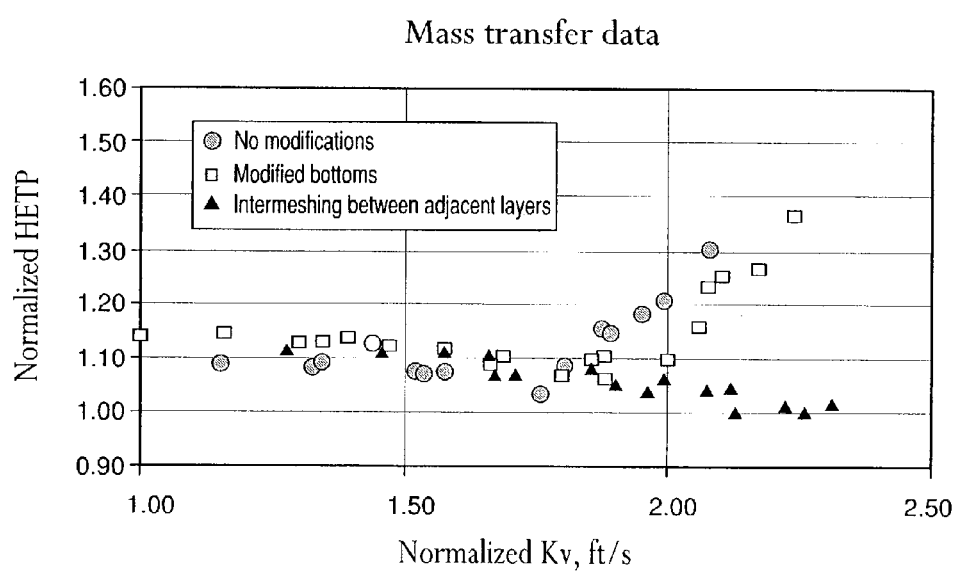
FIG. 12 is another graph illustrating the performance of the structured packing of the present invention in comparison to the performance of commercially available structured packing with and without modified bottoms in terms of normalized height equivalent to a theoretical plate (HETP) versus normalized vapor velocity (Kv).

FIGS. 11 and 12 compare the performance of the structured packing of the present invention to the performance of commercially available structured packing with and without modified bottoms. FIG. 11 is a graph of pressure drop data, which is shown in terms of normalized dP/ft versus normalized vapor velocity ($K_v$). FIG. 12 plots mass transfer data, which is shown in terms of normalized HETP versus normalized vapor velocity ($K_v$).

FIGS. 11 and 12 show the results of distillation experiments using Ar/$O_2$ binary at L/V=1 conditions, where L/V is the liquid to vapor ratio. Pressure drop of both the packing with modifications at the bottom of packing sheets and the intermeshing packing are lower than non-modified packing of the same base geometry. The mass transfer performance of intermeshing packing is clearly superior to both non-modified packing and packing modified at the bottom only. The packing with modifications at the bottom shows about a 10% delay in mass transfer flooding compared with non-modified packing, but the packing with increased intermeshing between layers shows no signs of mass transfer flooding in the studied range of vapor flows.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A packed section in an exchange column, the packed section including a plurality of vertically adjacent layers of corrugated structured packing, each layer having a top and a bottom, the packed section comprising:
   a first layer of corrugated structured packing comprising a first corrugated structured packing element having an upper edge adapted to intermesh with an adjacent lower edge of a second corrugated structured packing element; and
   a second layer of corrugated structured packing located above and vertically adjacent the first layer of corrugated structured packing, the second layer comprising the second corrugated structured packing element having the lower edge adapted to intermesh with the adjacent upper edge of the first corrugated structured packing element,
   wherein each of the corrugated structured packing elements has a plurality of corrugations forming alternating peaks and troughs across at least a portion of at least one surface of the corrugated structured packing element, and
   wherein the upper edge of the first corrugated structured packing element intermeshes with the adjacent lower edge of the second corrugated structured packing element, thereby reducing at least one uncontrolled gap between the bottom of the second layer of corrugated structured packing and the top of the first layer of corrugated structured packing.

2. A packed section as in claim 1, wherein the second layer of corrugated structured packing is rotated at an angle relative to the first layer of corrugated structured packing.

3. A packed section as in claim 1, wherein the angle is between about 0° and about 90°.

4. An assembly of a plurality of generally vertically adjacent layers of corrugated structured packing, each layer comprising a plurality of generally horizontally adjacent corrugated structured packing elements, each corrugated structured packing element having an upper edge and a lower edge opposite the upper edge, and each layer having a top comprising a plurality of the upper edges and a bottom comprising a plurality of the lower edges, the assembly comprising:
   a first layer of corrugated structured packing; and
   a second layer of corrugated structured packing located above and generally vertically adjacent the first layer of corrugated structured packing,
   wherein the lower edge of at least one of the corrugated structured packing elements in the second layer of corrugated structured packing is adapted to intermesh with the upper edge of at least one of the corrugated structured packing elements in the first layer of corrugated structured packing,
   whereby at least one uncontrolled gap between the bottom of the second layer of corrugated structure packing and the top of the first layer of corrugated structured packing is reduced by intermeshing the lower edge of at least one of the corrugated structured packing elements in the second layer of corrugated structured packing with the upper edge of at least one of the corrugated structured packing elements in the first layer of corrugated structured packing.

5. A method for assembling an assembly of a plurality of generally vertically adjacent layers of corrugated structured packing in an exchange column, each layer comprising a plurality of generally horizontally adjacent corrugated structured packing elements, each corrugated structured packing element having an upper edge and a lower edge opposite the upper edge, and each layer having a top comprising a plurality of the upper edges and a bottom comprising a plurality of the lower edges, comprising the steps of:
   providing the exchange column having a longitudinal axis;
   installing in the exchange column a first layer of corrugated structured packing;
   installing in the exchange column a second layer of corrugated structured packing located above and generally vertically adjacent the first layer of corrugated structured packing, wherein the lower edge of at least one of the corrugated structured packing elements in the second layer of corrugated structured packing is adapted to intermesh with the upper edge of at least one of the corrugated structured packing elements in the first layer of corrugated structured packing; and moving the first layer of corrugated structured packing and the second layer of corrugated structured packing toward each other along the longitudinal axis of the exchange column, each of the first and second layers of corrugated structured packing having a longitudinal axis substantially parallel to the longitudinal axis of the exchange column, whereby at least one uncontrolled gap between the bottom of the second layer of corrugated structure packing and the top of the first layer of corrugated structured packing is reduced by intermeshing the lower edge of at least one of the corrugated structured packing elements in the second layer of corrugated structured packing with the upper edge of at least one of the corrugated structured packing elements in the first layer of corrugated structured packing.

6. A method for increasing capacity in an exchange column for exchanging heat and/or mass between a liquid and a vapor, the exchange column adapted to contain a plurality of generally vertically adjacent layers of corrugated structured packing, each layer comprising a plurality of generally horizontally adjacent corrugated structured packing elements, each corrugated structured packing element having an upper edge and a lower edge opposite the upper edge, each layer having a top comprising a plurality of the upper edges and a bottom comprising a plurality of the lower edges, comprising the steps of:

modifying the upper edge of at least one of the corrugated structured packing elements in a first layer of corrugated structured packing;

modifying the lower edge of at least one of the corrugated structured packing elements in a second layer of corrugated structured packing located above and generally vertically adjacent the first layer of corrugated structured packing, wherein the modified lower edge of at least one of the corrugated structured packing elements in the second layer is adapted to intermesh with at least one modified upper edge of at least one of the corrugated structured packing elements in the first layer; and intermeshing the modified upper edge of at least one of the corrugated structured packing elements in the first layer of corrugated structured packing with the modified lower edge of at least one of the corrugated structured packing elements in the second layer of corrugated structured packing, whereby at least one uncontrolled gap between the bottom of the second layer of corrugated structured packing and the top of the first layer of corrugated structured packing is reduced by intermeshing the modified lower edge of at least one of the corrugated structured packing elements in the second layer of corrugated structured packing with the modified upper edge of at least one of the corrugated structured packing elements in the first layer of corrugated structured packing.

7. A method for delaying an onset of mass transfer flooding and reducing a pressure drop in an exchange column for exchanging heat and/or mass transfer between a liquid and a vapor, the exchange column adapted to contain a plurality of generally vertically adjacent layers of corrugated structured packing, each layer comprising a plurality of generally horizontally adjacent corrugated structured packing elements, each corrugated structured packing element having an upper edge and a lower edge opposite the upper edge, and each layer having a top comprising a plurality of the upper edges and a bottom comprising a plurality of the lower edges, comprising the steps of:

providing the exchange column;

installing in the exchange column a first layer of corrugated structured packing;

installing in the exchange column a second layer of corrugated structured packing located above and generally vertically adjacent the first layer of the corrugated structured packing, wherein the lower edge of at least one of the corrugated structured packing elements in the second layer of corrugated structured packing is adapted to intermesh with the upper edge of at least one of the corrugated structured packing elements in the first layer of corrugated structured packing; and reducing at least one uncontrolled gap between the bottom of the second layer of corrugated structured packing and the top of the first layer of corrugated structured packing by intermeshing the lower edge of at least one of the corrugated structured packing elements in the second layer of corrugated structured packing with the upper edge of at least one of the corrugated structured packing elements in the first layer of corrugated structured packing.

* * * * *